United States Patent [19]
Anderson et al.

[11] Patent Number: 5,961,604
[45] Date of Patent: Oct. 5, 1999

[54] STATUS MONITORING SYSTEMS FOR CABLE TELEVISION SIGNAL DISTRIBUTION NETWORKS

[75] Inventors: Robert P. Anderson, Lynden; William J. Crawford, Ferndale, both of Wash.

[73] Assignee: Alpha Technologies, Inc., Bellingham, Wash.

[21] Appl. No.: 09/090,099

[22] Filed: Jun. 3, 1998

Related U.S. Application Data

[60] Provisional application No. 60/048,404, Jun. 3, 1997.

[51] Int. Cl.$^6$ ........................................ G06F 13/00

[52] U.S. Cl. ............................................... 709/229

[58] Field of Search ................ 364/DIG. 1 MS File, 364/DIG. 2 MS File; 395/200.3, 200.32, 200.33, 200.38, 200.49, 200.53, 200.54, 200.59; 709/200, 202, 203, 208, 219, 223, 224, 229

[56] References Cited

U.S. PATENT DOCUMENTS 5,734,831   3/1998   Sanders .............................. 395/200.53

*Primary Examiner*—Robert B. Harrell
*Attorney, Agent, or Firm*—Michael R. Schacht; Hughes & Schacht, P.S.

[57] ABSTRACT

A system and method for determining the status of and controlling network devices distributed throughout a communications network. Each network device is provided with a server/interface module containing a device specific application for that particular network device. The device specific application contains a database of status and control information associated with its associated network device. The server interface module generates a web page that contains at least a portion of the database and is connected to the communications network so that a person using a standard internet browser can view and alter the data contained by the database. When changes and upgrades are made to network device, the browser need not be upgraded.

20 Claims, 9 Drawing Sheets

FIG. 10

ALARMS

Note: Select description for diagnostics information.

[Close]

Date/Time - 06/02/98 16:21:28

Severity Source Description     State

Major  IPM0  OUTPUT             Alarm
Major  PIM0  POWER SUPPLY A  Off
Minor  IPM1  BATT TEMP PROBE Alarm
Minor  ECS0  WATER INTRUSION Alarm Ⓐ  Return to Beginning of List

STATUS MONITORING SYSTEMS FOR CABLE TELEVISION SIGNAL DISTRIBUTION NETWORKS

RELATED APPLICATIONS

This application claims priority of U.S. Provisional patent application Ser. No. 60/048,404, which was filed on Jun. 3, 1997.

TECHNICAL FIELD

The present invention relates to systems and methods for determining the status of and controlling remotely located electronic devices and, more particularly, to such systems and methods optimized for use in a communications network.

BACKGROUND OF THE INVENTION

Communications networks contain network devices, such as power supplies, that are distributed throughout the network. Remote control and status monitoring of these network devices is desirable. Proprietary software for controlling and monitoring these network devices must be upgraded whenever changes are made to the network devices. This causes significant expense each time a given type of network device is newly introduced or changed. The need thus exists for a system that does not require software upgrades each time devices are newly introduced or changed.

SUMMARY OF THE INVENTION

A system and method for determining the status of and controlling network devices distributed throughout a communications network. Each network device is provided with a server/interface module containing an device specific application for that particular network device. The device specific application contains a database of status and control information associated with its associated network device. The server interface module generates a web page that contains at least a portion of the database and is connected to the communications network so that a person using a standard internet browser can view and alter the data contained by the database. When changes and upgrades are made to network device, the browser need not be upgraded.

BRIEF DESCRIPTION OF THE DRAWINGS

FIG. 10 depicts a browser page generated by the exemplary database structure and HTML generator code attached hereto as Exhibits A and B;

DETAILED DESCRIPTION OF THE INVENTION

Figure 1:
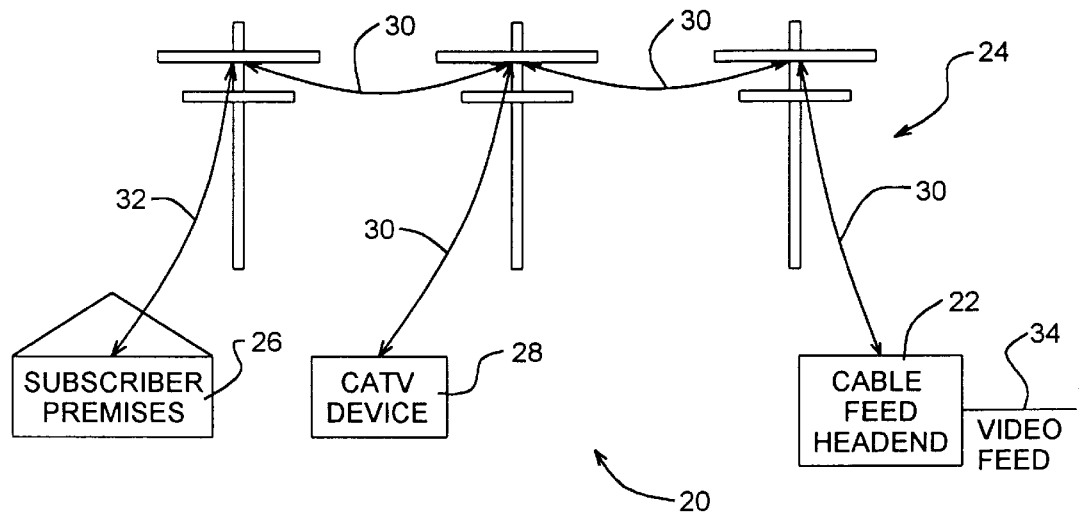
FIG. 1 is a block diagram showing a first type of communications system in which the present invention may be employed.

Referring to FIG. 1, depicted therein is a communications system 20 that embodies a network management system constructed in accordance with, and embodying, the principles of the present invention.

The communications system 20 comprises a cable feed headend 22, coaxial cables 24, at least one subscriber premises 26, and at least one network device 28. Coaxial cables comprise trunk cables 30 and drop cables 32. The trunk cables 30 have high current carrying capability and are designed to carry both a communications signal and a power signal. The drop cables 32 are relatively low current carrying conductors that are designed to carry only the communications signal.

The principles of operation of the system 20 are, at this level, well understood in the art and will be described herein only briefly. A video feed enters the cable feed headend 22 as shown at 34 in FIG. 1. The cable feed headend 22 converts the signal carried by the video feed 34 into one appropriate for transmission over the cables 24. The communications signal is carried over the cables 30 and 32 to the subscriber's premises 26. Throughout the system 20, numerous devices such as the device 28 are distributed for various purposes. For example, this device 28 may be an uninterruptible power supply, an end of line monitor, a video amplifier, a line extending amplifier, a fiber optic node, or a power node including a motor generator. Devices such as those listed in the previous sentence are integral to the proper functioning of the system 20. Accordingly, these devices must be controlled and their status must be monitored in order to ensure that the system 20 is functioning properly. If any of these devices 28 do not function properly, it must be repaired or replaced.

Figure 2:
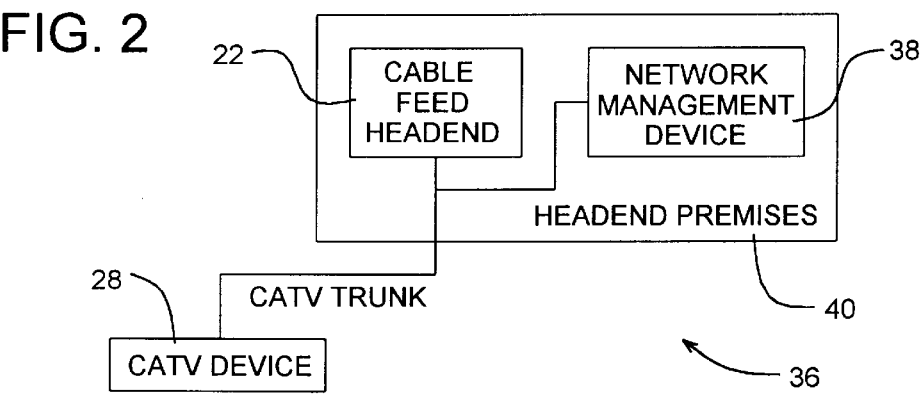
FIG. 2 is a block diagram showing the network management system of the present invention.

Referring now to FIG. 2, depicted therein is one exemplary configuration of a network management system 36 constructed in accordance with, and embodying, the principles of the present invention. As shown in FIG. 2, this system 36 comprises a network management device 38 located at the headend premises 40 at which the headend 22 is physically located.

Figure 3:
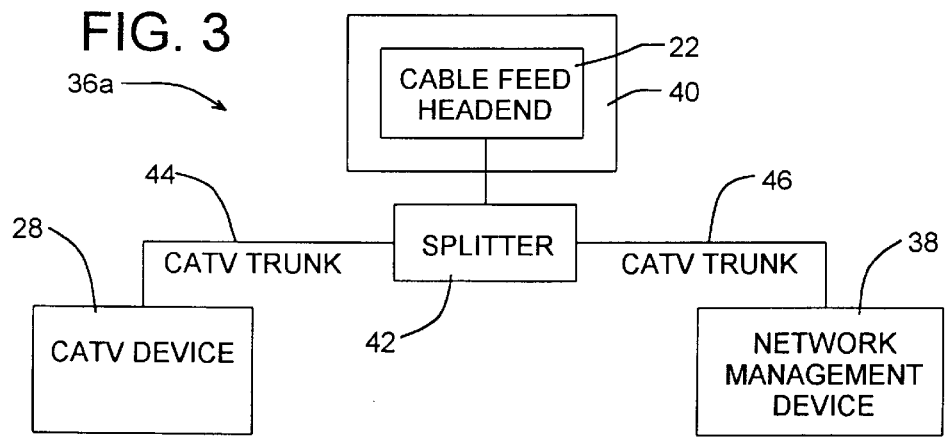
FIG. 3 is a block diagram depicting alternative embodiment of the network management system of the present invention.

FIG. 3 illustrates a network management system 36a in which the network management device is located at a location other than a cable feed headend 22. In this case, the network device 28 is at one location, the cable feed headend 22 is at another location, and the network management device 38 is at yet another location. In this particular example, a splitter 42 splits the output of the cable feed headend such that it feeds two separate CATV trunks 44 and 46.

The network management device 38 is a conventional computer capable of running an industry standard internet browser or an SNMP manager.

Figure 4:
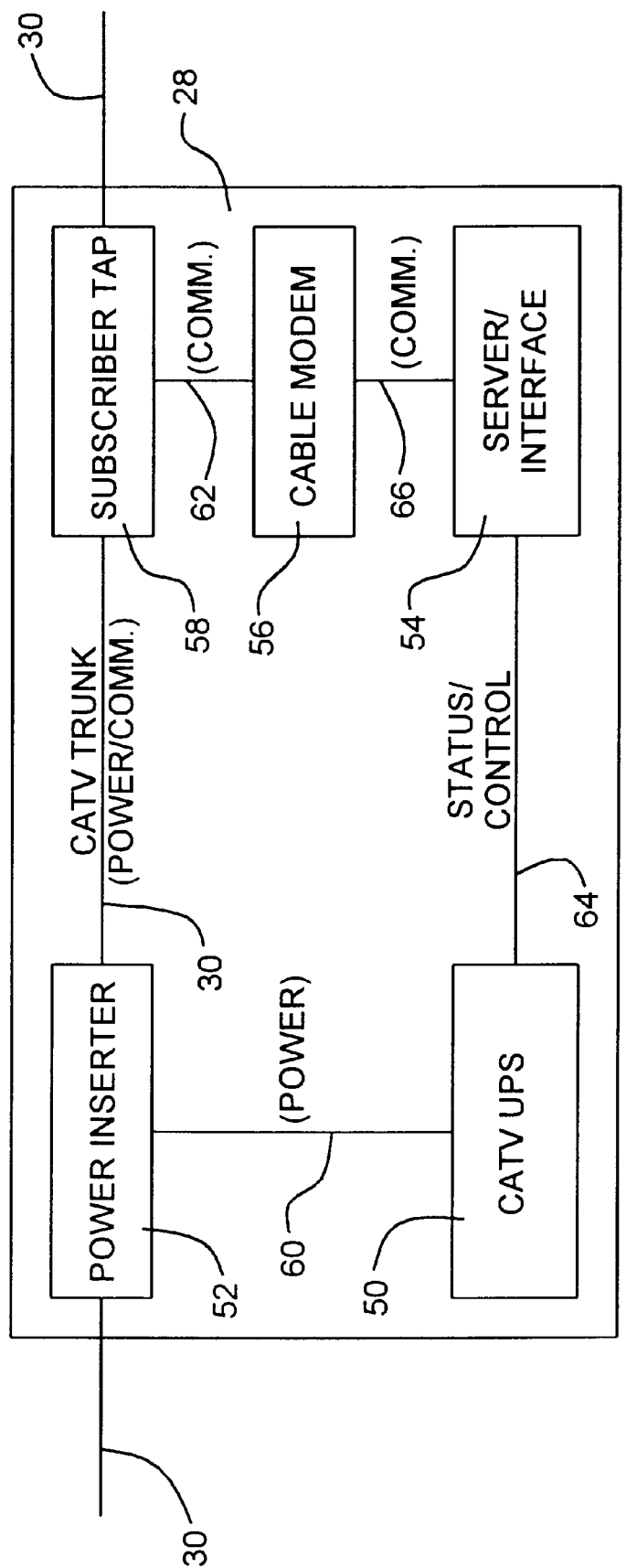
FIG. 4 is a block diagram depicting a network device incorporating a cable modem and server/interface module of the present invention.

Referring now to FIG. 4, the exemplary network device 28 is depicted therein in further detail. This device 28 comprises a CATV UPS 50, a power inserter 52, a server/interface module 54, a cable modem 56, and a subscriber tap 58. The UPS 50, power inserter 52, cable modem 56, and subscriber tap 58 are conventional and will not be described herein more than necessary for a complete understanding of the present invention.

As shown in FIG. 4, the UPS 50 is connected to the CATV trunk 30 through a power conductor 60 and the power inserter 52. The UPS 50 generates an AC signal that is appropriate for powering devices along the trunk such as line extending amplifiers and the like. The power inserter 52 combines the AC signal generated by the UPS 50 with the communications signal carried by the CATV trunk cable 30.

The subscriber tap 58 passes only communication signals from the CATV trunk cable 30 to a communications cable 62 connected to the cable modem 56. The cable modem 56 may thus send and receive data over the CATV trunk cable 30 through the subscriber tap 58.

The server/interface module 54 is connected by a serial cable 64 to the UPS 50. The server/interface module 54 is also connected by an appropriate communications cable 66 to the cable modem 56. The server/interface module 54 controls and monitors the status of the UPS 50 through the cable 64. The server/interface module 54 further is connected to the network management device 38 through the CATV trunk cable 30 via the cable modem 56. This arrangement allows the network management device 38 to send control signals to the UPS 50 through the server/interface module 54 and receive status information about the UPS 50 from the server/interface module 54.

Figure 5:
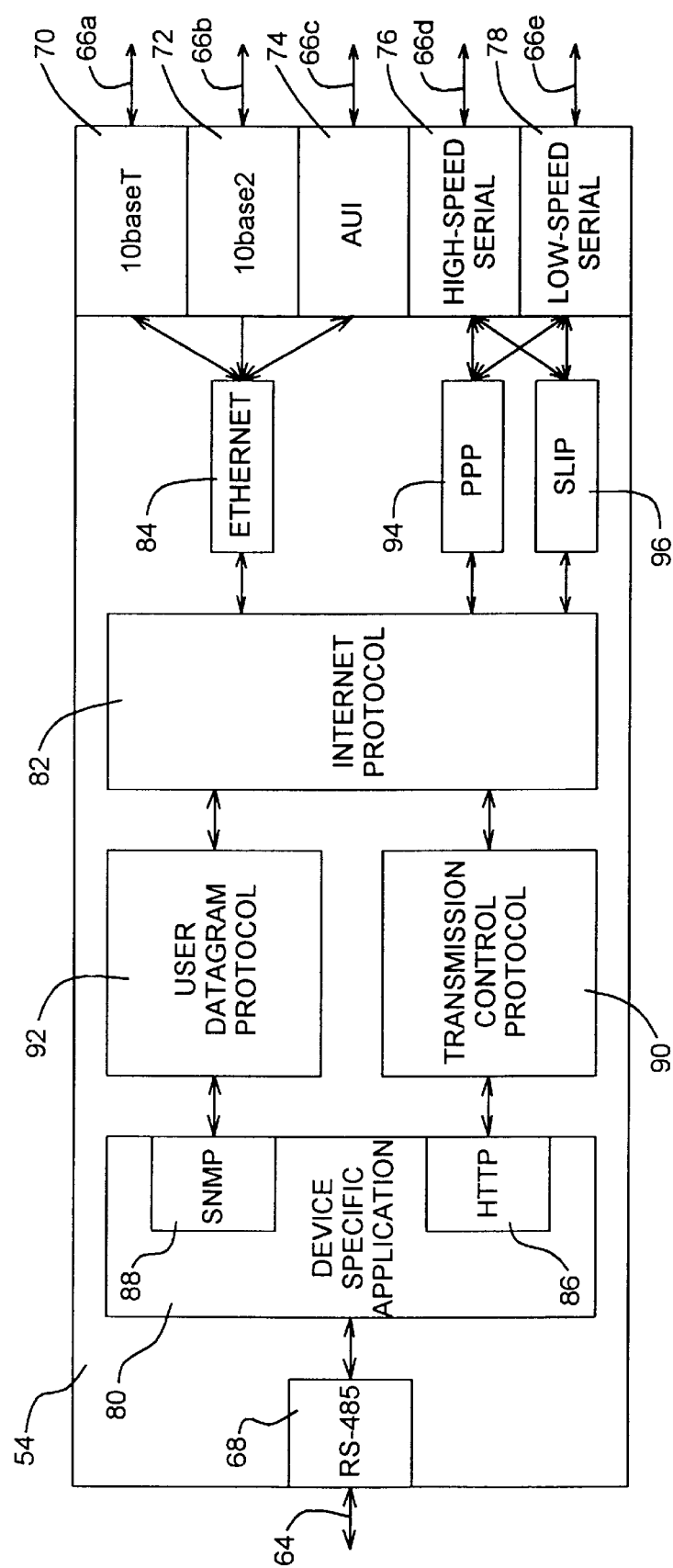
FIG. 5 is a block diagram showing the server/interface module depicted in FIG. 4.

Referring now to FIG. 5, the server/interface module 54 is depicted therein in further detail. The server/interface module 54 is a combination of hardware and software that controls and monitors the UPS 50 on one hand and, on the other hand, communicates with the network management device 38.

In particular, the exemplary module 54 comprises an RS485 port 68 that allows the serial cable 64 to be physically connected to the module 54. Other equivalent communications ports or systems may be used in place of the exemplary port 68. The module 54 further comprises a 10 base T port 70, 10 base 2 port 72, and an AUI port 74. One of these ports, as appropriate, is connected to the cable modem 56. These ports 70, 72, and 74 may also be connected directly to a computer having a similar port.

The module 54 further comprises high and low speed serial ports 76 and 78. These allow communications with the server/interface module 54 to occur through standard phone lines as appropriate.

In addition to the hardware connections described above, the server/interface module 54 comprises internet communications layering software. In particular, the module 54 comprises a device specific application 80, an internet protocol (IP) block 82, and an ethernet block 84. The device specific application 80 further comprises an HTTP block 86, and an SNMP block 88. The module 54 comprises computer hardware comprising a microprocessor, RAM memory, and ROM memory as necessary to execute the code discussed herein. This computer hardware portion of the module 54 is implicit in the block diagram of FIG. 5 and is or may be conventional. The implementation of this computer hardware will be easily understood by one of ordinary skill in the art. Accordingly, the computer hardware portion of the module 54 will not be described in detail herein.

The module 54 further comprises a transmission control protocol (TCP) block 90, a user datagram protocol (UDP) block 92, a point-to-point (PPP) block 94, and a serial line internet protocol (SLIP) block 96. The HTTP block 86 allows the device specific application 80 to communicate with the TCP block 90. Similarly, the SNMP block 88 allows the application 80 to communicate with the UDP block 92. The internet protocol block 82 allows the information processed by the transmission control protocol block 90 and/or user datagram protocol block 92 to be passed by the ethernet block 84 to the appropriate connectors 70, 72, and 74. The internet protocol block similarly makes this information available to the PPP block 94 and the SLIP block 96. These blocks 94 and 96 are in communication with either one of the serial ports 76 or 78.

Of the various components of the server/interface module 54, only the device specific application 80 is not an industry standard. The remaining blocks of the server/interface module are all industry standard; no proprietary hardware or software is required to allow the device specific application 80 to communicate with the network management device 38. Thus, while the combination of blocks disclosed herein in the context of a communications network is not known, given this discussion, one of ordinary skill in the art will be able to make and use the present invention without further discussion of the details of the blocks other than the device specific application 80.

Figure 6:
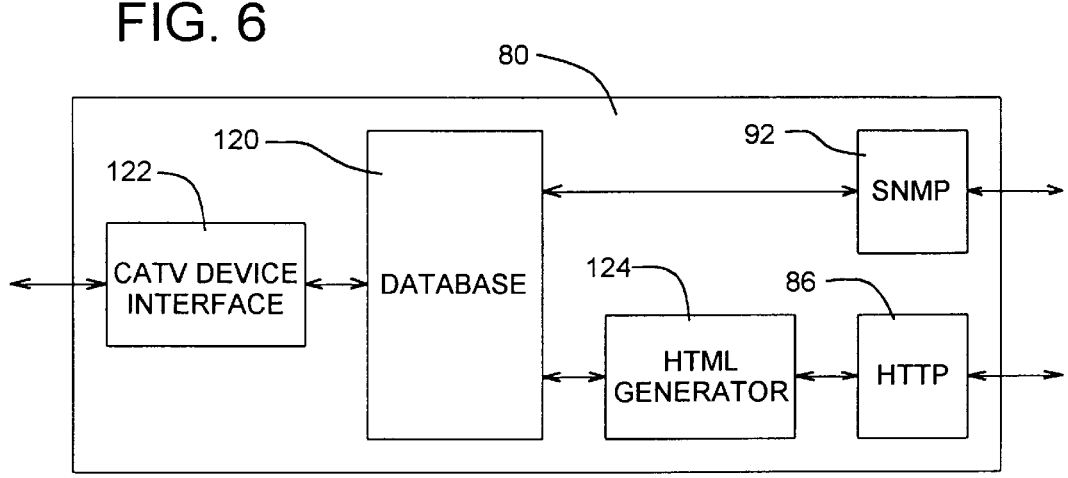
FIG. 6 is a block diagram showing the components of a device specific application as shown in FIG. 5.

Referring now to FIG. 6, the device specific application 80 is depicted therein in further detail. The application 80 comprises a database 120 that is in communication with the serial port 68 through a network device interface 122. The database 120 is in communication with the HTTP block 86 through an HTML generator block 124 and is in direct communication with the SNMP block 92.

The application 80 works basically as follows. The CATV device interface 122 communicates with various components of the network device 28. The interface 122 passes control signals to and receives status signals from the device 28. The database 120 comprises discrete, digital, and analog data related to certain aspects of the device 28. The network device 38 may thus interrogate the database 120 through the communications channel described above to determine the status of the various components of the CATV 28 for which values are contained in the database 120. Also, the network management device 38 may be used to change certain of these variables; when changed, the device interface 122 will pass these variables on to the CATV device 28 as control signals that change the status of this device 28.

For example, in the context of a CATV UPS, the following parameters may be monitored using the system 36: battery voltage, current, and temperature; input voltage and current; output voltage and current; standby status; engine generator status; tamper system status; water intrusion status; pad shear (movement) status; inverter status; charger status; device history; battery time remaining; and battery replacement status. Parameters that may be controlled include battery test, output voltage and current, engine generator operation, and the like. And certain of these variables can be both monitored and controlled.

As briefly discussed above, most of the hardware and software employed by the system 36 is industry standard and nonproprietary. Accordingly, off-the shelf hardware and software products may be used at significant cost savings. For example, as briefly described above, the contents of the database 120 can be converted to HTML by the HTML generator 124 and made available as a web site at the block 86. Simply by typing in the appropriate address of the HTTP block 86, an operator at the network management device 38 can use an industry standard browser such as Netscape Navigator or Microsoft Internet Explorer to view and change the contents of the database 120. The HTTP block 86 thus, in essence, functions as a web page displaying the status of the CATV device to which it is connected.

Alternatively, the SNMP agent 92 can be monitored using an industry standard SNMP manager to determine the status of the device to which the agent 92 is connected. The system 36 thus obviates the need for proprietary hardware and software to control and determine the status of the CATV devices distributed throughout the system 20.

Figure 7:
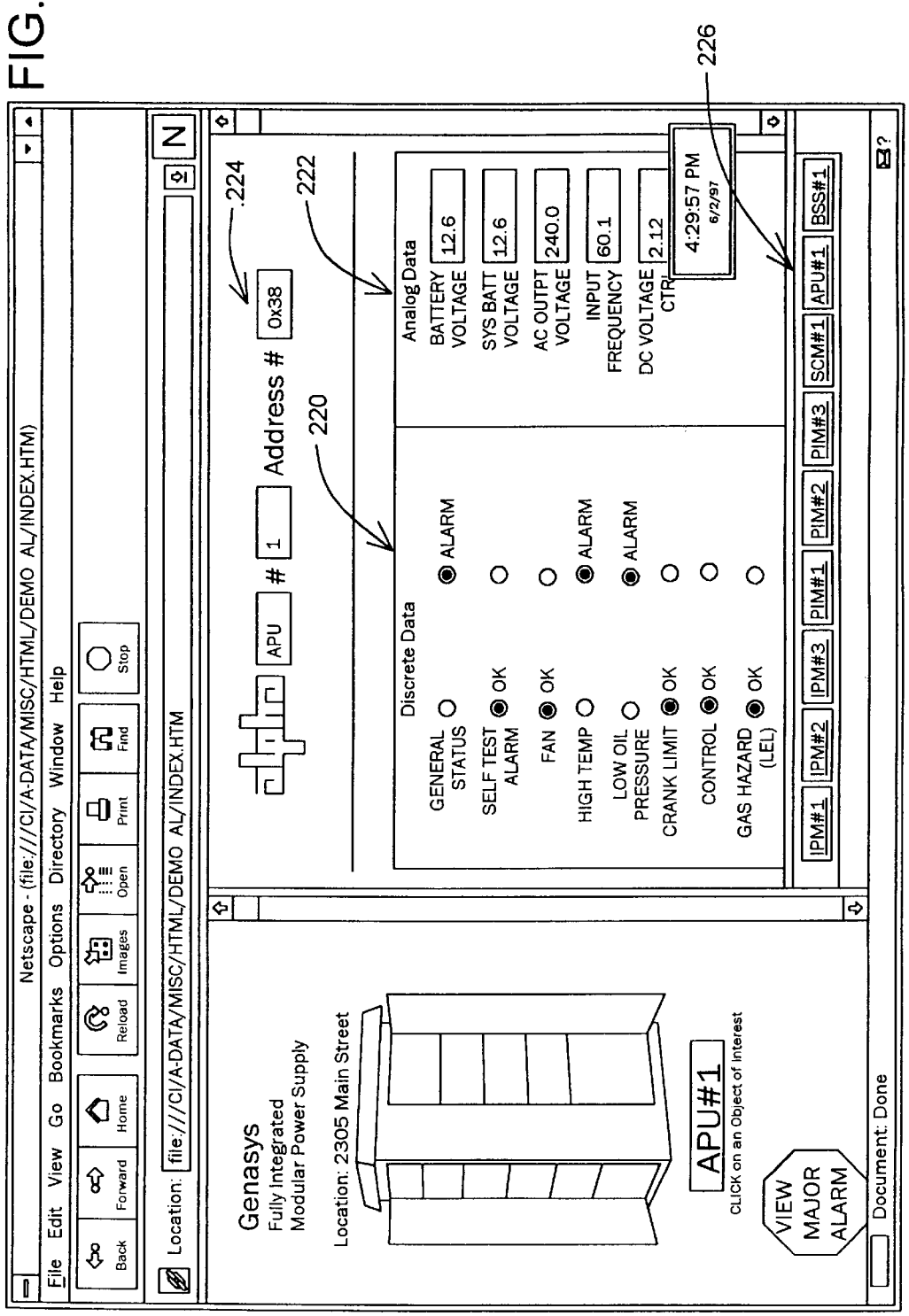
FIGS. 7 and 8 depict browser pages that illustrate the operation of the present invention.
Figure 8:
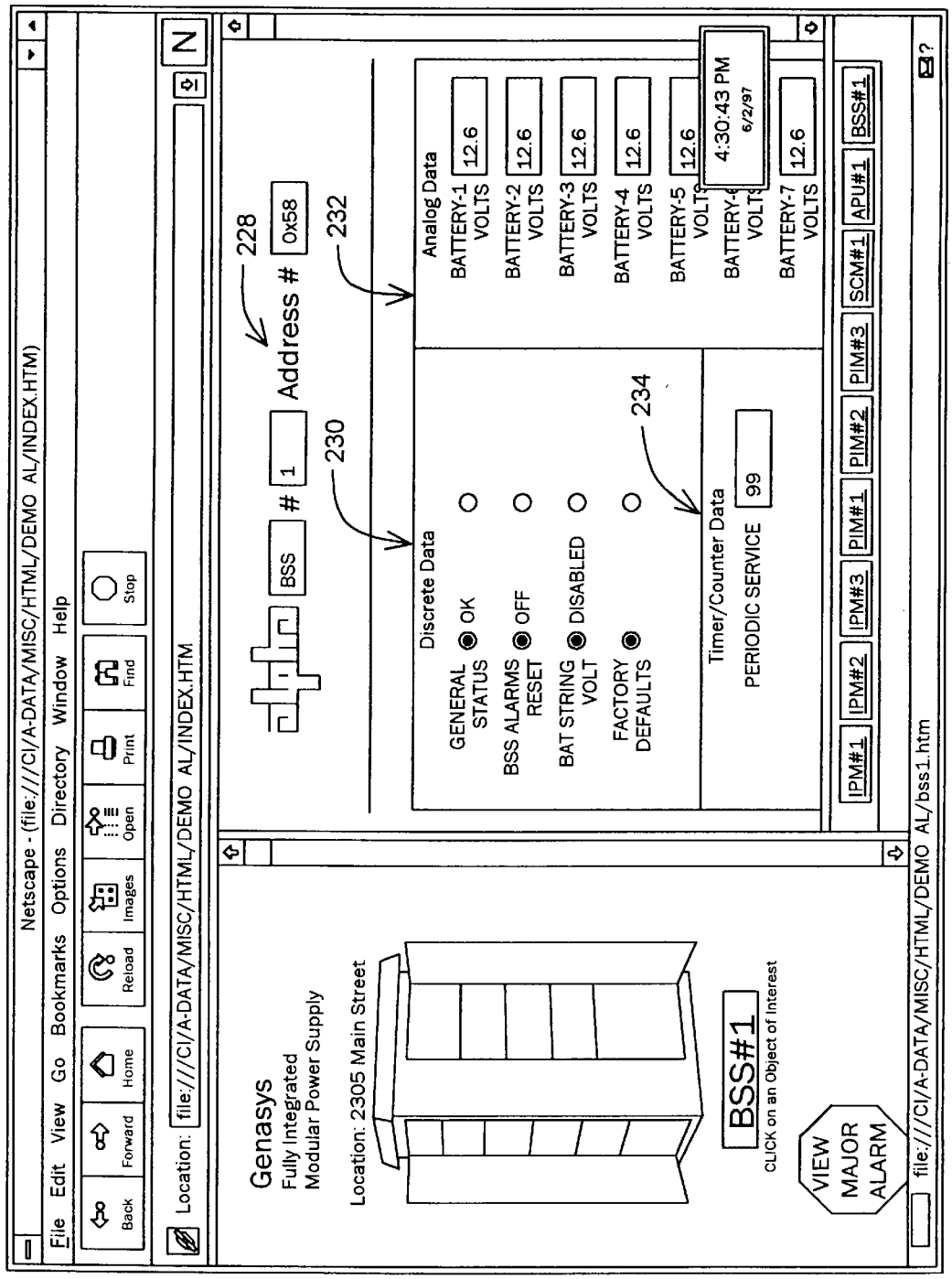

To illustrate this in further detail, FIGS. 7–8 depict demonstrations of the appearance of an industry standard Netscape Navigator browser connected to a particular power supply. Shown in the section generally indicated by reference character 220 is a display of certain discrete data maintained in a database such as the database 120 described above. The section identified by the reference character 222 contains analog data related to a given component. A section indicated by reference character 224 indicates the type of device and address of this device for which data is being displayed. And the section indicated by reference character 226 displays a number of devices the status of which may be monitored.

Referring for a moment to FIG. 8, shown at reference character 228 a different device is being monitored and/or controlled. The device being monitored is different from that monitored by the browser as shown in FIG. 7 and thus contains different sections. For example, in addition to a discrete data section 230 and an analog data section 232, the device shown in FIG. 8 displays a timer counter data section 234 that contains periodic service data for the device being monitored.

All of the logic necessary to control a given device and monitor that device are contained in the server/interface module 54 associated with that device and not in the network management device 38. Thus, as each generation of CATV devices designed and manufactured, an appropriate server/interface module 54 for that device is constructed. As part of this process, a "web page" is designed for that device that allows the device to be controlled and monitored as appropriate. This web page is viewed using an industry standard browser running on the network management device 38.

Accordingly, as each generation of CATV device is released, the software used by the network management device 38 need not be changed or updated as long as it conforms to industry standards for internet browsers. And the development of the server/interface module 54 requires only that the device specific application 80 be rewritten for each new type of cable TV device. Thus, control and monitoring of widely geographically distributed network devices can be accomplished simply by including a cable modem with each such device and creating a relatively simple firmware program included in that device that can be used as the device specific application 80.

Attached in the application file as Exhibit A as well as Exhibit B are exemplary database structure for one typical CATV device. For this particular device, the database structure of Exhibit A would be used as the database portion of the device specific application of the server/interface module 38 associated with that device. Exhibit B contains a sample of code for an exemplary HTML generator associated with the particular device associated with the database structure of Exhibit A. And FIG. 10 is a print-out of the web page generated by the database structure of Exhibit A and the HTML generator of Exhibit B. This database structure and HTML generator code are simply examples of what would be developed for a specific network device.

Figure 9:
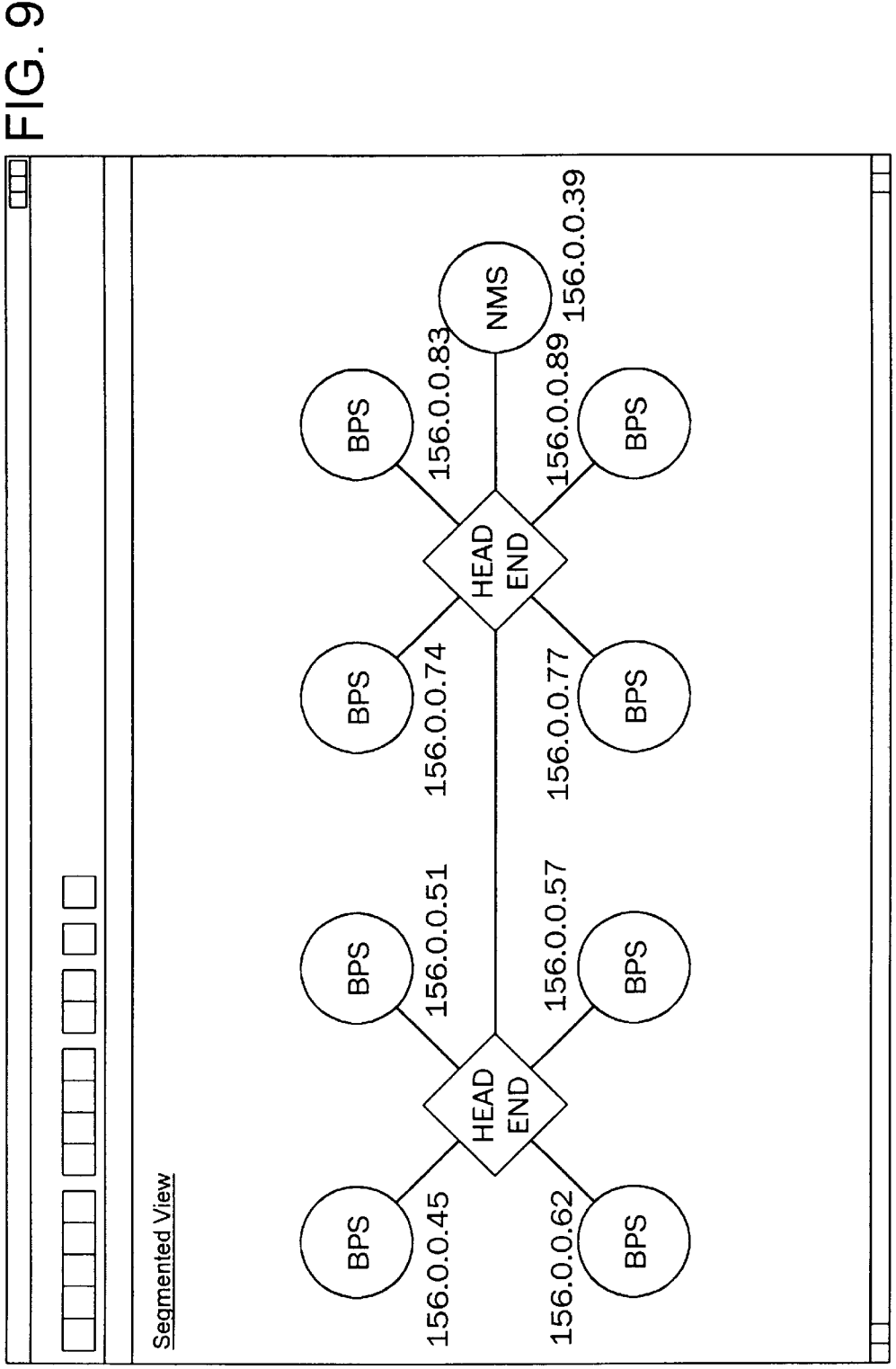
FIG. 9 depicts an SNMP manager employing the principles of the present invention.

Referring now for a moment to FIG. 9, depicted therein is the view displayed by an SNMP network manager that connects to the device specific application 80 through the user data grand protocol block 92. In this situation, as perhaps best shown in FIG. 6, the data in the database 120 is made available directly to the SNMP block 92 and certain of the intelligence required to display this data appropriately is contained in the network manager, which runs on the network management device 38. Although certain of the intelligence required to display this data is now distributed away from the device specific application 80, the SNMP network model is robust and widely accepted enough that this should not provide a significant disadvantage if this model is used to control and monitor the status of devices as shown in the present invention.

It should be apparent that modifications to this basic system described above may be made without departing from the spirit of the present invention. For example, a particular network device is shown in FIG. 4. Other network devices may connect to the CATV trunk cable 30 in a different manner. For example, the subscriber tap 58 may be built into the modem 56 or the power inserter 52.

Additionally, additional measures to protect the integrity of the system 20 may be taken such as providing password protection in the server/interface module 54 that allow different levels of access to the network device 28 attached thereto.

Figure 11:
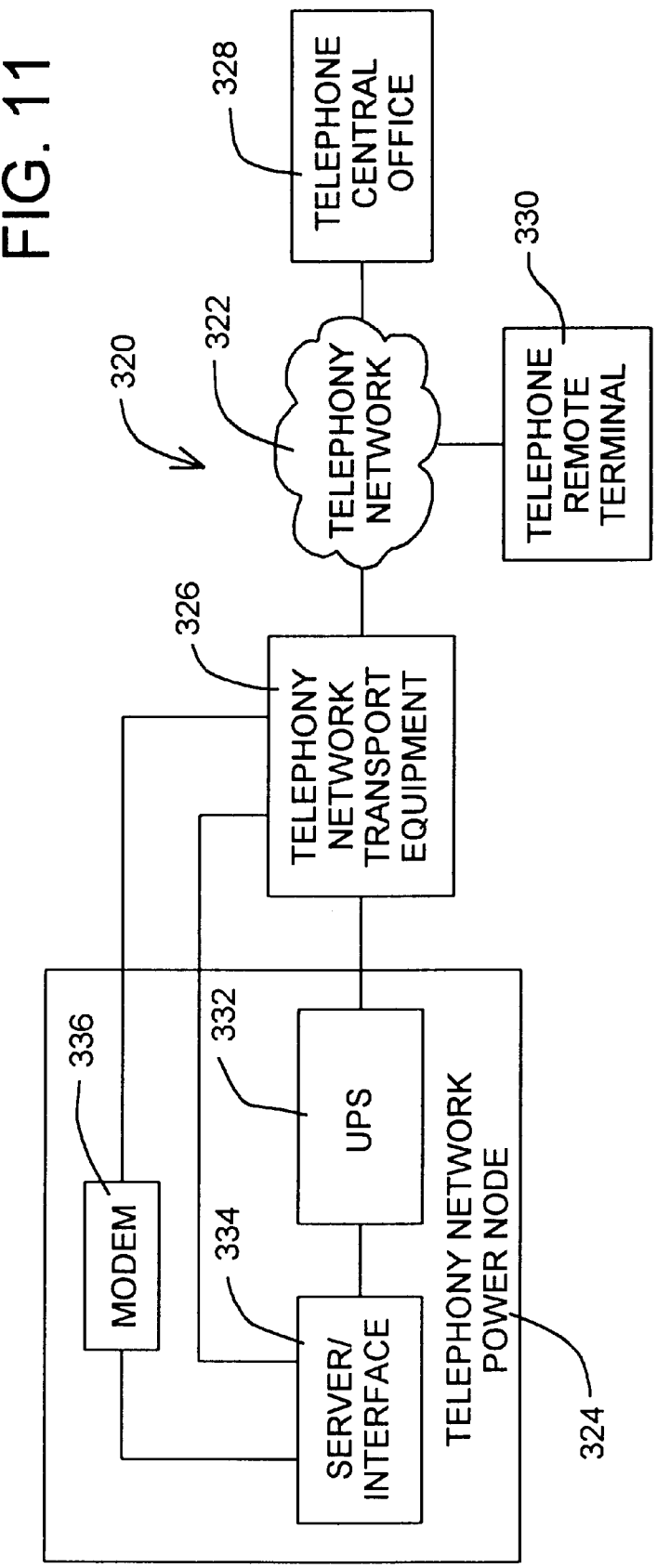
FIG. 11 is a block diagram showing a second type of communications system in which the present invention may be employed.

Referring now to FIG. 11, the present invention will be discussed in the context of a telephony communications system. Depicted in FIG. 11 is a communications system 320 comprising a telephony network 322, a telephony network power node 324, telephony network transport equipment 326, a telephone central office 328, and a telephone remote terminal 330.

The telephony network 322, telephony network transport equipment 326, and telephone central office 328 are well understood and will not be discussed in detail herein. The telephone remote terminal 330 is analogous to the network management device 38 discussed above and thus may simply be a general purpose computer capable of running off-the-shelf internet browser software. Additionally, an equivalent browser means may be located at the telephone central office 328.

The telephony network power node 324 comprises an uninterruptible power supply (UPS) 332, a server/interface module 334, and a modem 336. The UPS 332 is conventional and is connected to supply the telephony network transport equipment 326 with a DC power signal appropriate for powering this equipment 326. In addition to supplying a DC power signal rather than an AC power signal, the UPS 332 differs from the UPS 50 described above in that AC to DC rectifiers are main, the power supply equipment is mounted in an inner enclosure sealed from outside air present in the outer enclosure, and it uses heat exchangers rather than fan or passive cooling.

The server/interface module 334 is substantially the same as the server/interface module 54 described above except that the device specific application employed by the module 334 is written specifically for the particulars of the UPS 332.

The server/interface module 334 is connected to the telephony network 322 through the modem 336 or directly via an ethernet connection as illustrated by cable 338 in FIG. 11. In either situation, the internet address of the server/interface module 334 is accessible through the telephony network 322 by using a standard web browser located at the central office 328 and/or the remote terminal 330. Therefore, as with the server/interface module 54 discussed above, the device specific application of the server/interface module 334 allows control of the UPS 332 either at one or both of the central office 328 and the remote terminal 330.

The principles of the present invention are thus clearly applicable in environments, such as telephony, other than CATV systems.

The present invention may be embodied in other specific forms without departing from the essential characteristics thereof. The present embodiments are therefore to be considered in all respects as illustrative and not restrictive.

We claim:

1. A system for monitoring and controlling a network component located at a first location in a cable television network using browser software running on a general purpose computer located at a second location in and operatively connected to the cable television network, comprising:

server/interface means comprising
      status means adapted to be operatively connected to the network component to determine status information of the network component,
      control means adapted to be operatively connected to the network component to generate control signals for controlling the network component, and
      device specific application means comprising
         database means for storing status/control data associated with the status information and the control signals, and
         generator means adapted to generate browser data that may be interpreted by the browser software, where the browser data incorporates at least some of the status/control data; and
   connecting means adapted to connect the device specific application means to the cable television network such that the display data may be displayed and altered using the browser software, the connecting means comprising a modem for converting the browser data into communications data appropriate for transmission by the cable television network.

2. A system as recited in claim 1, in which the cable television network comprises coaxial cable that carries a power signal and a communications signal, where the power signal supplies power to other components distributed throughout the cable television network and the communications signal carries communications data.

3. A system as recited in claim 2, further comprising a tap assembly operatively connected to the coaxial cable of the cable television network and the modem to allow communications data to be transmitted between the cable television network and the modem.

4. A system as recited in claim 3, in which the network component is an uninterruptible power supply, the system further comprising a power inserter operatively connected to the coaxial cable of the cable television network and the uninterruptible power supply to allow power signals generated by the uninterruptible power supply to be transmitted to the cable television network.

5. A system as recited in claim 1, in which the server/interface means further comprises:
   at least one outlet port; and
   at least one communications subsystem consisting of an ethernet subsystem, a point-to-point subsystem, and a serial line internet protocol subsystem for transferring browser data to the at least one output port.

6. A system as recited in claim 1, further comprising a tap assembly operatively connected between the cable television network and the modem to allow communications data to be transmitted between the cable television network and the modem.

7. A system as recited in claim 1, in which the network component is selected from the group of network components consisting of an uninterruptible power supply, an end of line monitor, a video amplifier, a line extending amplifier, a fiber optic node, and a power node.

8. A system as recited in claim 1, in which the server/interface means further comprises an internet protocol subsystem for converting the status/control data into browser data and the browser data into status/control data.

9. A system as recited in claim 1, in which the server/interface means further comprises at least one of user datagram protocol subsystem and transmission control protocol subsystem for converting the status/control data into browser data and the browser data into status/control data.

10. A system as recited in claim 1, in which the server/interface means further comprises:
    at least one outlet port; and
    at least one communications subsystem consisting of an ethernet subsystem, a point-to-point subsystem, and a serial line internet protocol subsystem for transferring browser data to the at least one output port.

11. A system as recited in claim 1, in which the device specific application means further comprises a device interface configured to allow the status means to determine status information from the network component and the control means to transmit control signals to the network component.

12. A system as recited in claim 1, in which the server/interface means further comprises a telephony port operatively connected a telephony line, where the telephony port is configured to allow the browser data to be converted into telephony signals appropriate for transmission to the general purpose computer over the telephony line.

13. A network device for use in a cable television network having at least one control location at which is located a general purpose computer that runs industry standard browser software and which is operatively connected to the cable television network, the network device comprising:
    a network component operatively connected to the cable television network at a remote location to enable proper functioning of the cable television network;
    server/interface means comprising
       status means adapted to be operatively connected to the network component to determine status information of the network component,
       control means adapted to be operatively connected to the network component to generate control signals for controlling the network component, and
       device specific application means operatively connected to the server/interface means comprising
          database means for storing status/control data associated with the status information and the control signals;
          generator means adapted to generate browser data that may be displayed by the browser software, where the browser data incorporates at least some of the status/control data;
    a modem for converting the browser data into communications data appropriate for transmission by the cable television network such that the browser data may be displayed and altered using the browser software; and
    a tap assembly operatively connected between the cable television network and the modem to allow communications data to be transmitted between the cable television network and the modem.

14. A system as recited in claim 13, in which the cable television network comprises coaxial cable that carries a power signal and a communications signal, where the power signal supplies power to other components distributed throughout the cable television network and the communications signal carries communications data, the system further comprising a tap assembly operatively connected to the coaxial cable of the cable television network and the modem to allow communications data to be transmitted between the cable television network and the modem.

15. A system as recited in claim 14, in which the network component is an uninterruptible power supply, the system further comprising a power inserter operatively connected to the coaxial cable of the cable television network and the uninterruptible power supply to allow power signals generated by the uninterruptible power supply to be transmitted to the cable television network.

16. A system as recited in claim 13, in which the network component is selected from the group of network components consisting of an uninterruptible power supply, an end of line monitor, a video amplifier, a line extending amplifier, a fiber optic node, and a power node.

17. A system as recited in claim 13, in which the device specific application means further comprises a device interface configured to allow the status means to determine status information from the network component and the control means to transmit control signals to the network component.

18. A system as recited in claim 13, in which the server/interface means further comprises a telephony port operatively connected a telephony line, where the telephony port is configured to allow the browser data to be converted into telephony signals appropriate for transmission to the general purpose computer over the telephony line.

19. A system for monitoring and controlling an uninterruptible power supply operatively connected to a cable television network at a remote location using browser software running on a general purpose computer located at a control location in the cable television network, where the cable television network comprises coaxial cable carrying power and information signals, the system comprising:

server/interface means comprising
  status means adapted to be operatively connected to the uninterruptible power supply to determine status information of the uninterruptible power supply,
  control means adapted to be operatively connected to the uninterruptible power supply to generate control signals for controlling the uninterruptible power supply, and
  device specific application means comprising
    database means for storing status/control data associated with the status information and the control signals, and
    generator means adapted to generate browser data that may be interpreted by the browser software, where the browser data incorporates at least some of the status/control data;
a modem for converting the browser data into communications data appropriate for transmission by the cable television network such that the display data may be displayed and altered using the browser software;
a tap assembly operatively connected between the cable television network and the modem to allow communications data to be transmitted between the cable television network and the modem; and
a power inserter operatively connected to the coaxial cable of the cable television network and the uninterruptible power supply to allow power signals generated by the uninterruptible power supply to be transmitted to the cable television network.

20. A system as recited in claim 19, in which the server/interface means further comprises a telephony port operatively connected a telephony line, where the telephony port is configured to allow the browser data to be converted into telephony signals appropriate for transmission to the general purpose computer through the telephony line.

* * * * *